US009546305B2

(12) United States Patent
Hammond et al.

(10) Patent No.: US 9,546,305 B2
(45) Date of Patent: Jan. 17, 2017

(54) ULTRAVIOLET CUREABLE PRESSURE SENSITIVE ADHESIVES COMPRISING BOUND PHOTOINITIATOR AND VINYL GROUPS

(71) Applicant: Ashland Licensing and Intellectual Property LLC, Dublin, OH (US)

(72) Inventors: Terry Emerson Hammond, Columbus, OH (US); Zhaohui Sun, Dublin, OH (US)

(73) Assignee: ASHLAND LICENSING AND INTELLECTUAL PROPERTY LLC, Wilmington, DE (US)

( * ) Notice: Subject to any disclaimer, the term of this patent is extended or adjusted under 35 U.S.C. 154(b) by 0 days.

(21) Appl. No.: 14/225,902

(22) Filed: Mar. 26, 2014

(65) Prior Publication Data

US 2014/0290856 A1  Oct. 2, 2014

Related U.S. Application Data

(60) Provisional application No. 61/806,573, filed on Mar. 29, 2013.

(51) Int. Cl.
| | |
|---|---|
| *C09J 133/08* | (2006.01) |
| *C09J 7/02* | (2006.01) |
| *C09J 133/06* | (2006.01) |

(52) U.S. Cl.
CPC ............ *C09J 133/08* (2013.01); *C09J 7/0217* (2013.01); *C09J 133/066* (2013.01); *Y10T 428/2878* (2015.01)

(58) Field of Classification Search
CPC ..... C09J 133/08; C09J 133/066; C09J 7/0217; C09J 2433/00; C08F 2/04; C08F 2/06; C08L 51/00; C08G 18/76; C08G 18/672; C08G 18/81; B05D 3/067; Y10T 428/2878; Y10T 428/2891; Y10T 428/2896

USPC .......... 428/355 EN; 524/272, 315, 365, 553, 524/558; 156/332; 427/553
See application file for complete search history.

(56) References Cited

U.S. PATENT DOCUMENTS

| | | | |
|---|---|---|---|
| 4,614,761 A | | 9/1986 | Takiyama |
| 5,180,756 A | * | 1/1993 | Rehmer et al. ................. 522/35 |
| 5,391,406 A | | 2/1995 | Ramharack |
| 6,753,394 B2 | | 6/2004 | Weikard |
| 6,831,114 B2 | | 12/2004 | Husemann et al. |
| 6,908,665 B2 | | 6/2005 | Rea et al. |
| 6,964,999 B1 | | 11/2005 | Nakagawa |
| 7,157,535 B2 | | 1/2007 | Herr et al. |
| 7,521,487 B2 | | 4/2009 | Hansen et al. |
| 2003/0088031 A1 | * | 5/2003 | Husemann et al. ....... 525/329.7 |
| 2003/0129390 A1 | | 7/2003 | Husemann |
| 2004/0084138 A1 | * | 5/2004 | Henke et al. .............. 156/272.2 |
| 2006/0084713 A1 | | 4/2006 | Bach |
| 2006/0142408 A1 | * | 6/2006 | Liu et al. .......................... 522/6 |
| 2008/0138618 A1 | * | 6/2008 | Sasaki et al. ................. 428/345 |
| 2010/0255239 A1 | | 10/2010 | Hammond |

FOREIGN PATENT DOCUMENTS

WO    9309152    5/1993

OTHER PUBLICATIONS

International Search Report for PCT/US14/31840, dated Aug. 12, 2014.

* cited by examiner

*Primary Examiner* — Thao T Tran
(74) *Attorney, Agent, or Firm* — Dunlap Codding P.C.; Shaorong Chen

(57) ABSTRACT

Pressure sensitive adhesive ("PSA") compositions comprising a polymer having at least one vinyl group and a Type I photoinitiator bound to the polymer. The polymer is derivatized with a derivatizing agent comprising a vinyl group. The PSA can be cured by exposure to ultraviolet radiation.

22 Claims, No Drawings

ULTRAVIOLET CUREABLE PRESSURE SENSITIVE ADHESIVES COMPRISING BOUND PHOTOINITIATOR AND VINYL GROUPS

CROSS REFERENCE TO RELATED APPLICATIONS

This application claims the benefit of U.S. Patent Application No. 61/806,573, filed Mar. 29, 2013. U.S. Patent Application No. 61/806,573 is incorporated herein in its entirety by reference.

BACKGROUND OF THE INVENTION

Field of the Invention

Pressure sensitive adhesive ("PSA") compositions comprising polymer having a photoinitiator bound to the polymer chain that comprises at least one vinyl group. The PSA is cured by exposure to ultraviolet ("UV") radiation. The combination of the bound photoinitiator and vinyl group provides a synergistic effect with respect to UV curing. The cured PSA is useful for industrial tapes, and may be especially useful in tape applications for medical, food or electronics markets.

The Related Art

PSA comprising bound Type II photoinitiator groups have been discussed in the art, an example of which are BASF acResin® products. Type II photoinitiators involve bimolecular hydrogen abstraction based on species such as benzophenone or thioxanthone. Due to radical-radical coupling, PSA crosslinking reactions are possible without the need for vinyl groups. A limitation with such adhesives concerns depth of cure due to filtering of the UV light by the bound photoinitiator such that effective cure typically can only be attained with adhesive film thicknesses less than about 2 or 3 mils. Another limitation with Type II photoinitiators, particularly benzophenone, is that such species have been shown to be only effective at about 256 nm, and many additives can also absorb in this region and compromise UV cure.

The free radicals generated from a Type I photoinitiator, that is cleavage type photoinitiators, are known to be more reactive due to shorter lifetimes. With reactive double bonds present, these types of photoinitiators can be very effective at inducing UV cure. Also, they can be designed to have a broader UV absorption than typical Type II photoinitiators, such as benzophenone. Depending on the substitutions on the aromatic ring, some Type I photoinitiators absorb well above 256 nm and a few are even up into the visible spectrum (greater than 390 nm). Thus, a photoinitiator can be chosen that has absorption outside of the absorption window of other aromatic species in an adhesive composition, such as aromatic monomers, inhibitors and tackifiers. This is not always possible when Type II photoinitiators are used. A disadvantage with Type I photoinitiators concern the potential for migration from the adhesive, which is a significant concern if the adhesive is used in applications where migration of unused photoinitiator from the post cured adhesive is a concern.

UV curable PSA having good depth of cure with limited migration of photoinitiator species and photoinitiator compatibility with other components of the adhesive composition is desired. Such PSAs are particularly sought for applications where migration of the photoinitiators is a concern, such as in medical applications, electronic applications and foods.

All parts and percentages set forth in this specification and the appended claims are on a weight-by-weight basis unless otherwise noted.

SUMMARY OF THE INVENTION

The PSA composition comprises a polymer having a Type I photoinitiator bound to the polymer and at least one vinyl group (i.e. carbon-carbon double bond). The PSA composition may also comprise one or more additional components typically, those selected form the group consisting of tackifiers, stabilizers, fillers, solvents, plasticizers, and other components and the like, and combinations thereof.

The polymer comprising the bound photoinitiator is derivatized with a derivatizing agent that comprises a vinyl group, for example a monomer or polymer comprising at least one vinyl group. Typically, the derivatizing agent comprises functionality that reacts with a hydroxy group of the polymer comprising the bound photoinitiator to chemically attach the polymer with the vinyl group.

The PSA may be used in applications where conventional solution PSA are used, or other UV curable PSA. However, because the photoinitiator is bound to the polymer backbone, the PSA is useful in applications where photoinitiator migration from the PSA is a concern. These areas are typically medical, food, and electronic applications, although the PSA may be used in other applications where photoinitiator migration is a concern. However, application of the PSA is not necessarily limited to applications where photoinitiator migration is a concern. The combination of the bound photoinitiator and vinyl group provide synergistic effects in UV curing.

DETAILED DESCRIPTION OF THE INVENTION

Preferably, the polymer comprising the bound photoinitiator is an acrylic polymer. For purposes of this specification, the term "bound" means that the photoinitiator or an adduct comprising the photoinitiator is attached to the polymer, or becomes part of the polymer backbone, through chemical reaction.

The acrylic polymer comprises, and may be formulated with, monomers, such as those selected from the group consisting of 2-ethylhexyl acrylate, n-butyl acrylate, ethyl acrylate, iso-octyl acrylate, iso-decyl acrylate, lauryl acrylate, acrylic acid, methyl acrylate, methyl methacrylate, butyl methacrylate, vinyl acetate and the like, and combinations thereof. Typically, the polymer also comprises hydroxy functionality. The polymer can comprise, and be formulated with, hydroxy-functional acrylate monomers to impart the hydroxy functionality including those selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate and the like and combinations thereof. Lactide modified polymer, such as those described in U.S. Pat. No. 7,723,461 which is incorporated herein in its entirety by reference, like lactide modified 2-hydroxyethyl acrylate may be used as the acrylic polymer. Further, the hydroxy functionality can be imparted into the polymer through acid groups by inclusion of polymerizable acid functional monomers, typically by the incorporation of acylic acid in the polymer. Further, the polymer can comprise, and be formulated with, other polymerizable acid functional monomers such as methacrylic acid and 1-carboxyethyl acrylate, as well as monomers prepared from the reaction of an anhydride and a hydroxy function acrylate, such as 2-hydroxyethyl acrylate reacted with succinic anhydride (for example MAES from Dixie Chemical, Pasedena, Tex., U.S.A.). Combinations of polymerizable acid functional monomers can be used.

The photoinitiator is incorporated into the polymer by first forming an adduct by combining the Type I photoinitiator with one or more photoinitiator adduct monomers, such as an acrylate or methacrylate monomer, like an acid or anhydride, for example methacrylic anhydride. This is typically achieved by reacting the Type I photoinitiator with the photoinitiator adduct monomer in the presence of a catalyst. These photoinitiator adducts may then be reacted with the monomers discussed above to obtain the polymer having bound Type I photoinitiator.

Type I photoinitiators useful in the invention include those that have available reactive sites for combination with the photoinitiator adduct monomer, especially those containing hydroxy groups, such as benzoin or hydroxyacetophenone photoinitiators, and the like, and combinations thereof. A useful photoinitiator is 2-hydroxy-1-[4-(2-hydroxyethoxy)phenyl]-2-methyl-1-propanone which is commercially available under the trade name IRGACURE® 2959 from BASF, Parsippany, N.J., U.S.A. or R-gen 259 from Chitec Technology Corp., Taipei City, Taiwan. In an embodiment, the 2-hydroxy-1-[4-(2-hydroxyethoxy)phenyl]-2-methyl-1-propanone is reacted with methacrylic anhydride.

The polymer comprising bound Type I photoinitiator is synthesized in a two-step process. First, the hydroxy functional Type I photoinitiator is combined with one or more, usually one, type of monomer, the photoinitiator adduct monomer, in the presence of a catalyst. In the case of reaction of methacrylic anhydride with the hydroxy functional Type 1 photoinitiator, the components are mixed for a period of time, such as about 1 to about 7 hours, preferably about 2 hours to about 5 hours, at elevated temperature, such as about 100° C. to about 150° C., preferably about 115° C. to about 130° C. Typical catalysts used in the process include N-methyl imidazole, 4-dimethylaminopyridine, pyridine, or other catalysts useful for reaction of anhydrides with hydroxy groups. Other photoinitiator adduct monomers, such as acryloyl chloride or methacryloyl chloride could be used to attach a polymerizable vinyl group to the photoinitiator, but these would require purification to remove the generated hydrochloric acid. In the case of methacrylic anhydride, no purification is required, as the generated methacrylic acid will also copolymerize with the other components of the polymer.

In the second step, the reaction product from the process described immediately above which comprises the photoinitiator adduct or the photoinitiator adduct isolated from the reaction product is combined with one or more monomers. Typically, the monomers and the photoinitiator/monomer adduct are combined in a reactor with solvent and initiators. Generally, the monomer mixture can comprise about 1% to about 2%, by weight of the monomer mixture, of the photoinitiator adduct. The reaction is carried out at elevated temperature, such as about 60° C. to about 100° C., typically about 70° C. to about 85° C. Typical initiators that can be used include azobisisbutyronitrile ("AIBN"), dilauroyl peroxide, benzoyl peroxide, t-butyl peroxyoctanoate and the like, and combinations thereof. Common solvents are ethyl acetate, acetone, hexane, heptane, toluene and the like, and combinations thereof. For most purposes, ethyl acetate is the preferred solvent. The polymerization is typically carried out by a charge of part of the monomer mixture, solvent and initiator into the reactor. The contents are heated until reaction starts, and then the remaining monomers, solvent and initiator are fed into the reactor over time to spread out the heat of reaction due to the exothermic nature of the acrylate polymerization. A sufficient hold period, such as about up to about 4 to about 5 hours, is required after feeding the monomers to consume all of the initiator, so that subsequent addition of vinyl groups will not be compromised by a source of free radicals.

The polymer resulting from the above polymerization reaction comprising the bound Type I photoinitiator is functionalized with derivatizing agent that comprises a vinyl group. Typically, the derivatizing agent comprises a moiety having at least one vinyl group, that is having a carbon-carbon double bond (C=C), and at least one functional moiety that can react with a hydroxy on the polymer comprising the bound photoinitiator to derivatize the polymer with the vinyl group. Typically, at least one of the one or more monomers in the polymer comprises a hydroxy group and the step of reacting the polymer with the derivatizing agent comprises a reacting the derivatizing agent with the hydroxy group.

The moiety having at least one carbon-carbon double bond may be a monomer or polymer provided that such monomer or polymer comprises at least one carbon-carbon double bond. The derivatizing agent typically comprises acrylate monomers, i.e. agent acrylate monomer, to provide the vinyl group and these may include hydroxy-functional acrylate monomers such as those selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate and the like, and combinations thereof. Specialty hydroxy-functional acrylates like caprolactone acrylate (SARTOMER® 495, available from the Sartomer Company, Inc., Exton, Pa., U.S.A.) or ACE™ hydroxy acrylate monomers from Momentive Specialty Chemicals, Columbus, Ohio, U.S.A. can also be used, and also the lactide modified polymers described above.

In an embodiment the functional moiety that can react with the hydroxy-functional moiety on the polymer comprising the bound photoinitiator is provided to the derivatizing agent by an isocyanate group Thus, the derivatizing agent can comprise isocyanate, like diisocyanate, such as isophorone diisocyanate, toluene diisocyanate and the like, and combinations thereof. Such isocyanates can be used in conjunction with acrylates, including those discussed above. In this embodiment, the agent acrylate monomer and isocyanate may be, and typically are, combined in solvent, such as ethyl acetate, to form the derivatizing agent.

When the derivatizing agent comprises acrylate and diisocyanate, the ratio of agent acrylate monomer to diisocyanate is typically at least about 1:1, including greater than about 1:1, and preferably greater than about 1.1:1. In embodiments of the invention, the ratio of agent acrylate monomer to diisocyanate in the derivatizing agent is from about 1.1:1 to about 1.5:1, typically about 1.05:1 to about 1.5:1, preferably from about 1.15:1 to about 1.40:1. A typical ratio range of hydroxy-functional acrylate monomer to diisocyanate is from about 1.20:1 to about 1.35:1. Persons of ordinary skill in these arts, after reading this disclosure, will appreciate that all ranges and values for the ratio of acrylate monomer to diisocyanate within the explicitly stated ranges above are contemplated. At these ratios, the derivatizing agent will be a mixture of predominantly monoacrylate functionalized diisocyanate and diacrylate functionalized diisocyanate with very little, if any, free diisocyanate. Generally, the monoacrylate functionalized diisocyanate is the active derivatizing agent, while the diacrylate functionalized diisocyanate becomes a crosslinking agent during the UV curing process.

The polymer comprises from about 0.25% to about 2% polymerizable photoinitiator, preferably from about 0.5% to about 1.5%, such as about 1.0% to about 1.4%. Persons of ordinary skill in these arts, after reading this disclosure, will appreciate that all ranges and values within the explicitly stated ranges above are contemplated.

The polymer comprising the bound photoinitiator is derivatized by combining the derivatizing agent with the polymer, typically involving the reaction of a hydroxy group on the polymer comprising the bound photoinitiator with the functional moiety of the derivatizing agent that can react with the hydroxy-functional moiety of the polymer, such as an isocyanate-functional moiety. For example, the derivatizing agent can be added to the reactor in which the polymer is synthesized towards the end of polymerization or after polymerization is complete. Alternatively, the polymer may be derivatized separately by combining the polymer and derivatizing agent in a reactor at elevated temperature, such as about 60° C. to about 85° C. Typically, where the derivatization occurs with the acid group on the polymer, the temperature may be maintained at the high end of the range, such as about 80° C. to about 85° C., whereas for other derivation reactions, such as a urethane reaction, the temperature may be lower, such as in the range of about 70° C. to about 75° C. Generally, about 1% to about 4% derivatizing agent, based on the total weight of the derivatizing agent and polymer, may be used. Inhibitors, such as hindered phenols, like butylated hydroxytoluene ("BHT"), may be added in the reaction, particularly in embodiments where polymer is derivatized through an acid reaction.

Where the hydroxy functionality of the polymer is imparted by an acrylate, such as hydroxy-functional acrylate monomers, the derivatizing agent and the polymer comprising the bound photoinitiator undergo a urethane reaction. Where the hydroxy functionality of the polymer is imparted by an acid group, that is an acid group on the polymer comprises a hydroxy group, the final linkage formed between the isocyanate and the hydroxy of the acid group is a secondary amide and carbon dioxide is eliminated which prevents reversal of the reaction back to isocyanate resulting in a thermally stable product. In addition, with acid derivation the reaction is thermal and thus a catalyst is not necessary and the secondary amide functionality of the derivatizing agent is more stable to nucleophilic attack.

The derivatized polymer comprising the bound Type I photoinitiator can be incorporated into UV curable PSA composition. Typically, the PSA comprises solvent, such as ethyl acetate. The PSA composition generally has a solids content ranging from about 50% to about 80%, preferably about 60% to about 75%. However, PSA compositions comprising the polymer having 100% solids composition for hot melt applications are also within the scope of the invention. Persons of ordinary skill in these arts, after reading this disclosure, will appreciate that all ranges and values within the explicitly stated ranges above are contemplated.

The PSA composition may comprise one or more inhibitors. Because the UV curable PSA composition comprises reactive acrylate groups, a viable free radical scavenger may be present to prevent premature gelation, either in storage or preparation for coating, especially in the case of hot melt adhesive compositions. Inhibitors comprising phenolic compounds are one class of such materials that may be used in the invention, including, for example, 4-methoxyphenol ("MEHQ", methyl ether of hydroquinone), hydroquinone, 2-methylhydroquinone, 2-t-butylhydroquinone, t-butyl catechol, butylated hydroxy toluene, butylated hydroxy anisole and the like. Other inhibitors that may be used include phenothiazine and anaerobic inhibitors, such as the NPAL type inhibitors (tris-(N-nitroso-N-phenylhydroxylamine) aluminum salt) from Albemarle Corporation, Baton Rouge, La., U.S.A. Combinations of inhibitors may be used.

The PSA composition may also comprise one or more further components. Typically, these further components are selected form the group consisting of tackifier, crosslinking agent, stabilizer, filler, plasticizer and the like. Combinations of these materials may be used. The amount and type of these further components may be a function of the intended application of the PSA. For example, PSA compositions for low surface energy substrates will usually comprise tackifiers for peel performance. For high shear applications, a crosslinking agent may be of importance. For applications where the adhesive may experience temperature extremes, stabilizers may be used in the formulations.

The use of tackifier is preferred if low surface energy adhesion is a desired property of the PSA. Particularly effective and compatible with the acrylate polymer are rosin esters, preferably hydrogenated rosin esters. For higher temperature applications, glycerol tris-rosinate (FORAL® 85 available from Pinova Inc., Brunswick, Ga., U.S.A. and pentaerythritol tetra-rosinate (FORAL® 105 available from Pinova Inc.), and mixtures thereof are preferred. Other tackifiers that may be used include hydrocarbon $C_5$ and $C_9$ tackifiers and pure monomer hydrocarbon tackifiers, generally in amounts up to about 5% loading for acrylic compatibility. Overall loading of the tackifiers may range from about 10% to about 30%, and more typically about 15% to about 25%. Persons of ordinary skill in these arts, after reading this disclosure, will appreciate that all ranges and values within the explicitly stated ranges above are contemplated.

Cross linking agents useful in the invention, which generally enhance crosslink density in the UV cured adhesive, include multifunctional acrylate species. By increasing the crosslink density, the cohesive properties of the adhesive will improve, and shear performance should be enhanced. However, the selection and level of the crosslinking agent needs to be carefully determined. With the wrong type or level of multifunctional acrylate, the crosslink density can be much higher than desired, and peel performance will be greatly compromised. Multifunctional acrylates made from ethoxylated diols or triols are preferred crosslinking agents, such as ethoxylated hexanediol diacrylate, ethoxylated trimethylolpropane triacrylate and the like, and combinations thereof. Ethoxylated acrylates are generally more reactive than non-ethoxylated acrylates, in that the hydrogen atoms on the carbon next to the ether have been found to be labile and participate in the polymerization process. The UV curable PSA compositions may comprise about 1% to about 5%, preferably about 2% to about 3%, cross linking agent. Persons of ordinary skill in these arts, after reading this disclosure, will appreciate that all ranges and values within the explicitly stated ranges above are contemplated.

The PSA compositions comprising the derivatized polymer having bound Type I photoinitiator and at least one vinyl group can be used in any applications where conventional UV curable adhesives are used. For example, the PSA can be applied to one surface of a substrate having at least two surfaces and then cured, for example to make tape constructions, such as industrial tapes, particularly tapes used in applications where low or no migration of the photoinitiator is desired. The PSA may also be used in other applications, such as medical, food or electronics applications. Typically, low or no photoinitiator migration is desired in such applications.

The UV curable PSA described herein may be used for making PSA coated substrates, particularly in applications where migration of photoinitiator is a concern. Such methods comprise the steps of:

a. providing at least one substrate having one or more surfaces;

b. providing the PSA described herein;

c. applying the PSA to a surface of the substrate; and d. UV curing the PSA.

The PSA composition can also be applied to adhere substrates, for example, in a method comprising the following steps. Providing at least a first substrate and a second substrate each having one or more surfaces and providing the PSA having the polymer with derivatized polymer having bound Type I photoinitiator. The PSA is applied to at least one surface of at least the first substrate or the second substrate, or to both substrates. Next the PSA is cured with UV radiation. After the curing step, the surface of the substrate having the PSA is mated with a surface of the other substrate (which is not coated with the PSA) or in embodiments where at least one surface of each substrate is coated with the PSA, either the coated surfaces are mated or a coated surface of one substrate is mated with an uncoated surface of the other substrate, leaving at least one PSA coated surface of a substrate exposed.

The derivatized polymer has a synergistic combination of derivitization and polymerizable photoinitiator. Curing requires less UV dosage than other adhesive compositions and permits exemplary line speeds in application. Also, with both the derivatization and photoinitiator species anchored to the polymer, less extractables and migratory species will be present.

EXAMPLES

Example 1

An adduct of methacrylate and IRGACURE 2959 was synthesized from a mixture of 112.2 grams of IRGACURE 2959 (0.50 mole), 84.0 grams of Methacrylic Anhydride (NORSOCRYL® 500 from Arkema Inc., King of Prussia, Pa., U.S.A.) (0.54 moles), 21.8 grams of ethyl acetate solvent and 0.5 grams of N-methylimidazole catalyst as shown below.

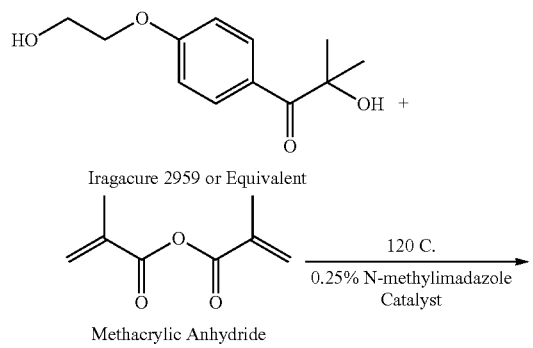

Iragacure 2959 or Equivalent

Methacrylic Anhydride

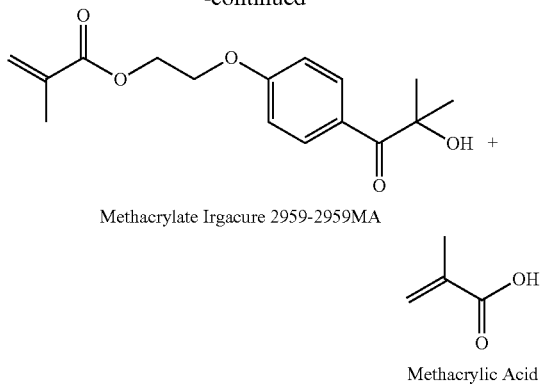

Methacrylate Irgacure 2959-2959MA

Methacrylic Acid

The mixture was heated to 120-122° C. with mixing for 3 hours. Conversion evaluation by $^{13}C$ NMR indicated greater than 95% conversion of the methacrylic anhydride and greater than 98% conversion of the IRGACURE 2959. The reaction product can be used without purification for the PSA preparation as both the adduct and residual methacrylic acid are capable of copolymerizing into acrylic polymer.

Example 2

A monomer mixture comprising the adduct from Example 1 was made with the components set forth in Table 1.

TABLE 1

| Component | Amount (grams) |
|---|---|
| 2-Ethylhexyl Acrylate | 727 |
| Methyl Acrylate | 218 |
| Vinyl Acetate | 150 |
| Acrylic Acid | 28 |
| 2-Hydroxypropyl Acrylate | 12 |
| Example 1 Adduct | 17 |
| 1-Dodecanethiol | 3.7 |
| AIBN Initiator | 2.5 |

523 grams of ethyl acetate solvent and 450 grams of the monomer mixture of Table 1 were transferred to a 2-liter jacketed reactor. With a slight nitrogen$_2$ sweep, the contents of the reactor were heated to a jacket temperature of 85° C. When the reactor contents reached about 73° C., an exotherm occurred, with the contents reaching 79.6° C. with vigorous solvent reflux. After the exotherm subsided in about 10 minutes, the remaining part of the monomer mixture was added through an addition funnel to the reactor over a 2 hour time period. After this addition was complete, the reactor was held at 85° C. jacket temperature for about 6 hours to insure that all of the residual AIBN was consumed. At this time, 0.35 grams of dibutyltin dilaurate and 0.35 grams of BHT were added to the reactor, and the active nitrogen sweep was stopped. Temperature was reduced to a jacket temperature of 73.5° C. The reactor was stirred for 30 minutes to insure temperature equilibration and adequate mixing. At this time, 28.6 grams of a derivatizing agent which was a pre-made adduct prepared from 2-Hydroxyethyl Acrylate and Isophorone Diisocyanate (1.35:1.00 molar ratio) in 30% ethyl acetate was added to the reactor. The active isocyanate of this adduct will react with the hydroxy groups in the polymer. The reactor was heated at 73.5° C. for one-hour to permit this reaction to go to completion. After this time, 0.40 grams in initiator MEHQ was added to the reactor, and the reactor was cooled to room temperature and the adhesive product was then bottled.

Example 3

Drawdowns using the adhesive product of Example 2 were prepared on release liner, followed by oven drying at 100° C., to generate 2-mil and 5-mil dried films. These films were UV cured with exposure dosages of 25 mJ/cm$^2$ UVC for the 2-mil films and 40 mJ/cm$^2$ UVC for the 5-mil films. After curing, the adhesive films were laminated to 2-mil PET facestock. Standard 180° peels from stainless steel and 1"×1"×1 kg shear failure times to steel panels were measured for these films. Pressure Sensitive Tape Council ("PSTC") standards were applied, particularly PSTC-101 Test Method for the peels and PSTC-107 Test Method for shear failure, both of which are incorporated herein in their entirety by reference. The results are set forth in Table 2. The peels were clean adhesive failure, with no residue or ghosting left on the stainless steel panel. The shear failure for the 5-mil film was a mixture of adhesive and cohesive failure.

TABLE 2

| Test | SS 2-Mil UV Cured | 5-Mil UV Cured |
|---|---|---|
| 180° Peel Strength on SS (in lb/in) | 4.22 A | 6.31 A |
| 1" × 1" × 1 kg Shear Failure Time in Hours | >310 Hours (no failure) | 86 Hours |

Example 4

Further testing of the adhesive of Example 2 was completed on a 20 mil film with a UV cure dosage of about 85 mJ/cm$^2$ UVC. This film was prepared by first stripping the solvent, and then preparing a drawdown on a heated drawdown apparatus, simulating a hot melt application. The peel for this adhesive was greater than 4 lbs/in, and the stainless steel was still completely free of residue after the peel. This demonstrates the dual functionality of the derivatization and the polymerizable photoinitiator provides a unique product that can be cured to very high film thickness.

Examples 5 and 6

Monomer mixtures comprising the adduct from Example 1 were made with the components set forth in Table 3.

TABLE 3

| Component | Example 5 Amount (grams) | Example 6 Amount (grams) |
|---|---|---|
| 2-Ethylhexyl Acrylate | 50 | 50 |
| Butyl Acrylate | 30 | 31 |
| Vinyl Acetate | 13 | 15 |
| Acrylic Acid | 3.2 | 3 |
| 2-Hydroxypropyl Acrylate | 1.8 | 1.3 |
| Example 1 Adduct | 1.5 | 1.2 |
| 1-Dodecanethiol | 0.3 | 0.3 |
| AIBN | 0.2 | 0.2 |

The polymerizations for Examples 5 and 6 were performed using the procedure described in Example 2 with ethyl acetate solvent at approximately 65% solids content. When polymerization was complete, the polymer solutions were derivatized with varying amounts of a derivatizing agent (DA) comprising 2-Hydroxyethyl Acrylate and Isophorone Diisocyanate (1.35:1.00 molar ratio) in 30% ethyl acetate using the procedures described above in Example 2. Polymers made from the monomer mixture of Example 5 were derivatized with 1.50%, 1.75%, 2.00% and 3.00%, all by weight, derivatizing agent. Polymers made from the monomer mixture of Example 6 were derivatized with 1.65% and 1.90%, both by weight, derivatizing agent.

Example 7

Drawdowns using the adhesive products of Examples 5 and 6 were prepared on release liner, followed by oven drying at 100° C., to generate 2-mil and 5-mil dried films. These films were UV cured with exposure dosages of 25 mJ/cm$^2$ UVC for the 2-mil films and 40 mJ/cm$^2$ UVC for the 5-mil films. After curing, the adhesive films were laminated to 2-mil PET facestock. Standard 180° peels from stainless steel and 1"×1"×1 kg shear failure times to steel panels were measured for these films. PSTC standards were applied, particularly PSTC-101 Test Method for the peels and PSTC-107 Test Method for shear failure. The shear results are set forth in Table 4, although not wishing to be bound by any theory, the inventors believe that the samples made with adhesive of Example 5 may have experienced over cure. The peels were adequate but lower than desired.

TABLE 4

| SAMPLE STUDIED | SHEAR FOR 2-MIL FILM (UV @ 80 FPM) | SHEAR FOR 5-MIL FILM (UV @ 60 FPM) |
|---|---|---|
| Example 5/3.0 wt % DA | >336 Hrs | >336 Hrs |
| Example 5/2.0 wt % DA | >336 Hrs | >336 Hrs |
| Example 5/1.75 wt % DA | >336 Hrs | >336 Hrs |
| Example 5/1.5 wt % DA | >336 Hrs | 39 Hrs |
| Example 6/1.65 wt % DA | 60 Hrs | 11 Hrs |
| Example 6/1.90 wt % DA | 50 Hrs | 34 Hrs |

Examples 8A (Comparative) and 8

Monomer mixtures were made with the components set forth in Table 5. The formulation of Example 8A does not comprise any adduct having photoinitiator.

TABLE 5

| Components | Example 8A Amount (grams) | Example 8 Amount (grams) |
|---|---|---|
| 2-Ethylhexyl Acrylate | 50.0 | 50.0 |
| Butyl Acrylate | 25.5 | 24.2 |
| Methyl Acrylate | 20.0 | 20.0 |
| Acrylic Acid | 3.0 | 3.0 |
| 2-Hydroxypropyl Acrylate | 1.5 | 1.5 |
| Example 1 Adduct | — | 1.3 |
| 1-Dodecanethiol | 0.28 | 0.28 |
| AIBN | 0.21 | 0.21 |

The polymerizations for Examples 8A and 8 were performed using the procedure described in Example 2 with ethyl acetate solvent at approximately 68% solids content. When polymerization was complete, the polymer solutions were derivatized with varying amounts of a derivatizing agent (DA) comprising 2-Hydroxyethyl Acrylate and Isophorone Diisocyanate (1.35:1.00 molar ratio) in 30% ethyl acetate using the procedures described above in Example 2.

Polymers made from the monomer mixture of Example 8A were derivatized with 3.50%, by weight, derivatizing agent. Polymers made from the monomer mixture of Example 8 were derivatized with 1.50%, 1.75% and 3.50%, all by weight, derivatizing agent. Adhesive formulations made from the polymer for Example 8A further comprised IRGACURE 2959 photoinitiator in amounts of 1.6% by weight and 0.77% by weight. The IRGACURE 2959 photoinitiator in an amount of 0.77% by weight in the adhesive formulation of Example 8A is equivalent to the amount of active photoinitiator in a polymer made with 1.30% by weight of an adduct of methacrylate and IRGACURE 2959. For experimental purposes, an adhesive composition comprising trimethylolpropane triacrylate ("TMPTA") and the polymer of Example 8 without derivatization was made and tested as discussed below.

Drawdowns using the adhesive products of Examples 8A and 8 were prepared on release liner, followed by oven drying at 100° C., to generate 2-mil, 4-mil and 12-mil dried films. These films were UV cured with exposure dosages of 25 mJ/cm$^2$ UVC for the 2-mil films, 54 mJ/cm$^2$ UVC for the 4-mil films and 81 mJ/cm$^2$ UVC for the 12-mil films. After curing, the adhesive films were laminated to 2-mil PET facestock. Standard 180° peels from stainless steel and 1"×1"×1 kg shear failure times to steel panels were measured for these films. PSTC standards were applied, particularly PSTC-101 Test Method for the peels and PSTC-107 Test Method for shear failure. The results are set forth in Table 6 for the 2-mil films, Table 7 for the 4-mil films and Table 8 for the 12-mil films. Note that in the tables (C) represents cohesive failure.

TABLE 6

(2 mil Data)

| SAMPLE STUDIED | PEEL in lb/in | SHEAR (1" × 1" × 2 kg) in Hr |
|---|---|---|
| Example 8 A with 3.5% DA; 1.6% Irgacure 2959 | 4.64 | 33.0 |
| Example 8 with 3.5% DA | 2.37 | >400 |
| Example 8 with 1.75% DA | 3.34 | 65.7 |
| Example 8 with 1.5% DA | 3.84 | 36.7 |
| Example 8 with 0% DA; 1.5% TMPTA | 4.83 (C) | 17.7 |

The data set forth in Table 6 demonstrates a difference in the cure level for equivalent levels of derivation. For example, when both Example 8 and 8A are derivatized at 3.5 wt % derivatizing agent (DA) comprising 2-Hydroxyethyl Acrylate and Isophorone Diisocyanate, the shears results indicate a difference in crosslink density (33 hours versus no failure after 400 hours). It is only when the level of derivation is dropped to 1.5 wt % does the shear become very similar (33 hours versus 36.7 hours). The polymer of Example 8 with no derivation but with 1.5 wt % TMPTA added fails cohesively for peels and has much lower shears at 17.7 hours, thus the polymer is not crosslinked enough to be an effective pressure sensitive adhesive.

TABLE 7

(4 mil Data)

| SAMPLE STUDIED | PEEL in lb/in | SHEAR (1" × 1" × 2 kg) in Hr |
|---|---|---|
| Example 8 A with 3.5% DA; 1.6% Irgacure 2959 | 5.22 | 11.2 |
| Example 8 A with 3.5% DA; 0.77% Irgacure 2959 | 3.96 | 13.3 |
| Example 8 with 3.5% DA | 2.88 | 118.2 |
| Example 8 with 1.75% DA | 4.51 | 16.2 |
| Example 8 with 1.5% DA | 5.44 | 12.0 |
| Example 8 with 0% DA; 1.5% TMPTA | 10.83 (C) | 9.1 |

The data patterns for the 4-mil samples as shown in Table 7 are consistent with the data patterns for the 2-mil samples as shown in Table 6. Example 8 with 3.5% derivatizing agent has high shears and much lower peels indicating a much higher level of crosslinking than for the other samples made with Examples 8 and 8A.

TABLE 8

(12 mil Data)

| SAMPLE STUDIED | PEEL in lb/in | SHEAR (1" × 1" × 2 kg) in Hr |
|---|---|---|
| Example 8 A with 3.5% DA; 1.6% Irgacure 2959 | 7.09 | 9.5 |
| Example 8 with 3.5% DA | 3.59 | 20.6 |
| Example 8 with 1.75% DA | 6.24 | 15.7 |
| Example 8 with 1.5% DA | 7.22 | 16.4 |
| Example 8 with 0% DA; 1.5% TMPTA | 12.51 (C) | 10.1 |

The data set forth in Table 8 demonstrates good adhesive properties for a 12 mil cured film. The data patterns for the 2-mil, 4-mil and 12-mil films are consistent. Comparing the test results for Example 8A with 3.5% derivatizing agent and 1.6% IRGACURE 2959 with Example 8 with 1.5% derivatizing agent on the 12 mil films, the peels are similar (7.09 versus 7.22), but the shears are better for Example 8 with 1.5% derivatizing agent (16.4 versus 9.5 hours) thereby indicating that the polymer having the bound photoinitiator provides better overall cure at the lower derivatization level than does the derivatized polymer with added photoinitiator. Overall the results from Examples 6, 7 and 8 demonstrate that the polymer having the bound photoinitiator provides an effective means for UV cure, and requires very little double bond for achieving this cure.

Example 9

Monomer mixtures comprising the adduct from Example 1 were made with the components set forth in Table 9. In this example the hydroxyl functionality to imparted to the polymer by the acrylic acid.

TABLE 9

| Component | Amount (Grams) |
|---|---|
| 2-Ethylhexyl Acrylate | 798 |
| Methyl Acrylate | 360 |
| Acrylic Acid | 42 |

TABLE 9-continued

| Component | Amount (Grams) |
|---|---|
| Example 1 Adduct | 17.6 |
| 1-Dodecanethiol | 3.8 |
| AIBN | 2.6 |

The polymerization for Example 2 was performed using the procedure described in Example 2 with ethyl acetate solvent at approximately 68% solids content. After waiting 5 hours after monomer and initiator additions at 85° C. jacket temperature, the 0.31 grams of BHT and 25.0 g (2% of the total reactants) of a pre-made adduct of Hydroxyethyl Acrylate and Isophorone Diisocyanate (1.25:/1.00 molar ratio) were added to the reactor. The polymerization was performed under a nitrogen atmosphere, but during the derivatization, the atmosphere was switched to air so that oxygen would help inhibit any premature crosslinking reaction of the acrylate double bond. The reaction mixture was heated for 1 hour at the jacket temperature of 85° C., and then cooled. During the cool down time, 0.44 g MEHQ was added for final stabilization of the polymer.

Example 10

Drawdowns using the adhesive product of Example 9 were prepared on release liner, followed by oven drying at 100° C., to generate 2-mil and 5-mil dried films. These films were UV cured with exposure dosages of 25 mJ/cm² UVC for the 2-mil films and 40 mJ/cm² UVC for the 5-mil films. After curing, the adhesive films were laminated to 2-mil PET facestock. Standard 180° peels from stainless steel and 1"×1"×1 kg shear failure times to steel panels were measured for these films. PSTC standards were applied, particularly PSTC-101 Test Method for the peels and PSTC-107 Test Method for shear failure. The results are set forth in Table 10.

TABLE 10

| FILM THICKNESS | 24-Hour Dwell, 180° Peel on Stainless Steel | 1" × 1" × 1 kg Shear |
|---|---|---|
| 2-mil | 4.0 A | >402 Hrs |
| 5-mil | 4.8 A | 313 Hrs |

The results from this example indicate a very good performing PSA, with relatively high peels that fail adhesively off of stainless steel and very high shear failure times. The derivatization reaction was successful in anchoring the acrylated urethane to the polymer via an acid reaction.

What is claimed is:

1. A derivatized polymer, comprising a polymer backbone having constituents bound thereto, wherein (A) the polymer backbone is derived from at least one (meth)acrylate monomer, and (B) the constituents are:
    (i) a photoinitiator adduct present in an amount ranging from about 1% to about 2%, by total weight of the photoinitiator adduct and the polymer backbone, wherein the photoinitiator adduct comprises a reaction product of (a) a Type I photoinitiator and (b) a (meth) acrylate monomer in the form of an anhydride or an acid; and
    (ii) a derivatizing agent present in an amount ranging from about 1% to about 4%, by total weight of the derivatizing agent and the polymer backbone, comprising an acrylate monomer and a diisocyanate, wherein the molar ratio of the acrylate monomer to the diisocyanate is in a range of from about 1.05:1 to about 1.5:1 such that the derivatizing agent comprises a monoacrylate functionalized diisocyanate and a diacrylate functionalized diisocyanate.

2. The derivatized polymer of claim 1, wherein the at least one (meth)acrylate monomer is selected from the group consisting of 2-ethylhexyl acrylate, ethyl acrylate, isooctyl acrylate, iso-decyl acrylate, lauryl acrylate, n-butyl acrylate, acrylic acid, methyl acrylate, methyl methacrylate, butyl acrylate, vinyl acetate, methacrylic acid, β-carboxyethyl acrylate, 2-hydroxyethyl acrylate, 2-hydroxypropyl acrylate, 4-hydroxybutyl acrylate, 2-hydroxyethyl methacrylate, 2-hydroxypropyl methacrylate, and combinations thereof.

3. The derivatized polymer of claim 1, wherein the Type I photoinitiator is selected from the group consisting of benzoin, hydroxyacetophenone, and combinations thereof.

4. The derivatized polymer of claim 3, wherein the Type I photoinitiator is 2-hydroxy-1-[4-(2-hydroxyethoxy)phenyl]-2-methyl-1-propanone.

5. The derivatized polymer of claim 1, wherein the acrylate monomer of the derivatizing agent comprises a hydroxy-functional acrylate monomer.

6. The derivatized polymer of claim 5, wherein the hydroxy-functional acrylate monomer is selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, caprolactone acrylate, and combinations thereof.

7. The derivatized polymer of claim 1, wherein the diisocyanate is selected from the group consisting of isophorone diisocyanate, toluene diisocyanate, and combinations thereof.

8. A process for making a derivatized polymer comprising a polymer backbone having constituents bound thereto, the process comprising:
    a) reacting (i) a Type I photoinitiator and (ii) one or more (meth)acrylate monomers in the form of an anhydride or an acid to obtain a photoinitiator adduct, wherein the photoinitiator is present in an amount ranging from about 1% to about 2%, by total weight of the photoinitiator adduct and the polymer backbone
    b) reacting the photoinitiator adduct and a polymer backbone comprising one or more monomers to obtain a polymer backbone having a bound photoinitiator adduct, and
    c) reacting the polymer backbone having the bound photoinitiator adduct of step b) and a derivatizing agent comprising at least one vinyl group, wherein the derivatizing agent comprises an acrylate monomer and a diisocyanate at a molar ratio in a range of from about 1.05:1 to about 1.5:1 of the acrylate monomer to the diisocyanate such that the derivatizing agent comprises a monoacrylate functionalized diisocyanate and a diacrylate functionalized diisocyanate, and further wherein the derivatizing agent is present in an amount ranging from about 1% to about 4%, by total weight of the derivatizing agent and the polymer backbone.

9. The process of claim 8, wherein the acrylate monomer of the derivatizing agent comprises a hydroxy-functional acrylate monomer selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, caprolactone acrylate, and combinations thereof.

10. The process of claim 8, wherein the Type I photoinitiator is selected from the group consisting of benzil, benzoin ethers, benzil esters, hydroxyacetophenones, phosphine oxides, and combinations thereof.

11. The process of claim 8, wherein at least one of the one or more monomers in step b) comprises a hydroxyl group and step c) comprises reacting the derivatizing agent and the hydroxyl group.

12. The process of claim 11, wherein an acid group on the polymer comprises the hydroxyl group.

13. The process of claim 8, wherein the one or more monomers in step b) are selected from the group consisting of 2-ethylhexyl acrylate, ethyl acrylate, isooctyl acrylate, iso-decyl acrylate, lauryl acrylate, n-butyl acrylate, acrylic acid, methyl acrylate, methyl methacrylate, butyl acrylate, vinyl acetate, methacrylic acid, β-carboxyethyl acrylate, 2-hydroxyethyl acrylate, 2-hydroxypropyl acrylate, 4-hydroxybutyl acrylate, 2-hydroxyethyl methacrylate, 2-hydroxypropyl methacrylate, and combinations thereof.

14. A derivatized polymer, comprising a polymer backbone having constituents bound thereto, wherein (A) the polymer backbone is derived from at least one (meth) acrylate monomer, and (B) the constituents are:
   (i) a photoinitiator adduct present in an amount ranging from about 1% to about 2%, by total weight of the photoinitiator adduct and the polymer backbone, wherein the photoinitiator adduct comprises a reaction product of (a) a Type I photoinitiator and (b) a (meth) acrylate monomer in the form of an anhydride; and
   (ii) a derivatizing agent present in an amount ranging from about 1% to about 4%, by total weight of the derivatizing agent and the polymer backbone, comprising an acrylate monomer and a diisocyanate, wherein the molar ratio of the acrylate monomer to the diisocyanate is in a range of from about 1.05:1 to about 1.5:1 such that the derivatizing agent comprises a monoacrylate functionalized diisocyanate and a diacrylate functionalized diisocyanate.

15. A pressure sensitive adhesive composition comprising the derivatized polymer of claim 1.

16. The pressure sensitive adhesive composition of claim 15, further comprising an inhibitor selected from the group consisting of 4-methoxyphenol, hydroquinone, 2-methylhydroquinone, 2-t-butylhydroquinone, t-butyl catechol, butylated hydroxy toluene, butylated hydroxytoluene, butylated hydroxy anisole, phenothiazine, anaerobic inhibitors, and combinations thereof.

17. The pressure sensitive adhesive composition of claim 15, further comprising a crosslinking agent selected from the group consisting of ethoxylated hexanediol diacrylate, ethoxylated trimethylolpropane triacrylate, and combinations thereof.

18. The pressure sensitive adhesive composition of claim 15, further comprising a rosin ester.

19. The pressure sensitive adhesive composition of claim 15, further comprising a solvent selected from the group consisting of ethyl acetate, acetone, hexane, heptane, toluene, and combinations thereof.

20. A process, comprising:
   a. providing at least a first substrate having one or more surfaces;
   b. providing the pressure sensitive adhesive of claim 15;
   c. applying the pressure sensitive adhesive to at least one surface of the first substrate; and
   d. curing the pressure sensitive adhesive with ultraviolet radiation.

21. The process of claim 20, further comprising providing a second substrate having one or more surfaces and mating the surface of the first substrate having the pressure sensitive adhesive with a surface of the second substrate.

22. A coated substrate made by the process of claim 20.

* * * * *